United States Patent [19]

Lindenthal

[11] Patent Number: 4,464,139
[45] Date of Patent: Aug. 7, 1984

[54] TELESCOPIC SHAFT
[75] Inventor: Hans Lindenthal, Heidenheim-Mergelstetten, Fed. Rep. of Germany
[73] Assignee: Voith Transmit GmbH, Fed. Rep. of Germany
[21] Appl. No.: 318,285
[22] Filed: Nov. 4, 1981
[30] Foreign Application Priority Data
Nov. 4, 1980 [DE] Fed. Rep. of Germany ....... 3041528
[51] Int. Cl.³ .......................... F16C 3/03; F16D 3/48
[52] U.S. Cl. ....................................... 464/69; 464/138
[58] Field of Search ................. 464/69, 137, 138, 162
[56] References Cited
U.S. PATENT DOCUMENTS
1,242,906 10/1917 Augustine ............................. 464/69

1,633,935 6/1927 Fletcher et al. ................ 464/138 X
2,097,062 10/1937 Harris ............................. 464/137 X
2,551,837 5/1951 Holloway ............................. 464/69
3,393,536 7/1968 Daur .................................. 464/138

FOREIGN PATENT DOCUMENTS
1977640 1/1968 Fed. Rep. of Germany .
6908115 1/1974 Fed. Rep. of Germany .
2522108 11/1976 Fed. Rep. of Germany .
419054 10/1910 France .............................. 464/138

Primary Examiner—Stuart S. Levy
Assistant Examiner—Daniel P. Stodola
Attorney, Agent, or Firm—Kuhn, Muller and Bazerman

[57] ABSTRACT

A telescoping shaft which is displaceable in the axial direction with low force wherein the inner shaft and hollow shaft are connected by guide pins swivelly connected to the shafts.

3 Claims, 2 Drawing Figures

TELESCOPIC SHAFT

BACKGROUND OF THE INVENTION

The invention concerns a telescoping shaft.

Telescoping shafts are generally a part of a drive shaft with universal joints at both ends, and usually have a spline shaft profile between the inner shaft and the hollow shaft. Such a shaft is known, e.g., from German Utility Model 69 08 115. The axial displaceability of the two shaft sections is of the order of the diameter of the driving flange.

Since the axial displacement is a pure sliding movment, in a tooth contour with close tolerances, considerable energy is required for the displacement, even when friction and wear are reduced by a special coating. Low surface pressure requires large friction surfaces and a large unit for the longitudinal compensation.

Another telescoping shaft known from DOS 25 22 108 utilizes an inner shaft to reduce the axial force required for the displacement, which is provided with three runways designed as radial grooves, in which roll radially arranged rollers which are rotatably mounted on the inner surface of the hollow shaft.

The frictional resistance can be substantially reduced by this design, but it still can exceed the low axial force desired in certain applications. A telescoping shaft of the above-described type is intended for installations which are subject to considerable axial displacement during operation under load. For telescopic shafts which only cover small displacements, this type of shaft is too elaborate.

A toggle joint clutch is known (German Utility Model 1,977,640), wherein toggle joints are used for the transmission of the torque, which transmit the circumferential force in pairs in each direction of rotation from the driving- to the driven shaft. The arrangement of the toggle joints ensures a centric but not buckling-resistant guidance of the two clutch halves, that is, elastic spherical joints allow the toggle joints cardanic mobility of the shaft ends. Axial movements of the shafts are possible in this clutch only within the framework of the radial elasticity of the spherical elastic joint, due to the symmetrical arrangement of the guide rods. This clutch can perform its function only due to the elasticity of the spherical joints.

SUMMARY OF THE INVENTION

The object of the invention is to provide a telescopic shaft for transmitting high torques with small axial movements appearing in operation with a small longitudinal displacement force and short overall length.

In accordance with the telescoping shaft of the present invention, for the transmission of a torque between an inner shaft and a hollow shaft partly assembly arranged coaxially, provided with at least two guide rods arranged inside the hollow shaft in a plane perpendicular to the longitudinal axis and symmetrical about the shaft center. The guide rods are mounted with one end on the inner shaft and the other end on the hollow shaft assembly so that one end of a guide rod connected with the hollow shaft assembly alternates with one end of a guide rod connected with the inner shaft, seen in the direction of rotation. Both ends of the guide rods have spherical bearings movable in all directions.

Each individual guide rod can thus not only turn in a plane perpendicular to the longitudinal axis of the shaft, but also in a plane parallel to the longitudinal axis of the shaft (in contrast to the subject of German Utility Model 1 977 640). This axial swivel movement - relative to the longitudinal axis of the telescopic shaft causes a reduction of the effective length of the guide rod in the circumferential direction, due to the angular movement relative to the plane normal to the telescopic shaft longitudinal axis, which manifests itself as a rotation of the inner shaft relative to the hollow shaft. This relative rotation is negligible, however. An advantage of the present invention is that the guide rods are arranged on each shaft in only one location so that the inner shaft can be displaced relative to the hollow shaft a distance determined only by the permissible deflection of the spherical bearings at the ends of the guide rods.

BRIEF DESCRIPTION OF THE DRAWINGS

The drawing shows an embodiment of the invention described more fully below.

DETAILED DESCRIPTION OF THE INVENTION

An axial displacement of the two shaft parts relative to each other thus corresponds to a swivel movement in the spherical bearings, while the transmission of the torque to the spherical bearings and the elements carrying them is effected by means of a tangential force. The easy mobility of the spherical bearings, even under load, is utilized in the invention and permits the transmission of high torques with a minimum of force required for axial displacement. Another advantage is that substantial freedom from play is achieved by the use of spherical bearings. The telescopic freedom from play is achieved by the use of spherical bearings. The telescoping shaft according to the invention has thus a reduced residual imbalance, compared to telescoping shafts with longitudinal compensation by spline shafts. This has a favorable effect on the inherent frequency of the telescoping shaft. Due to the arrangement of the guide rods in one plane, the telescoping shaft of the present invention is of short overall length.

The guide rods between the inner shaft and the hollow shaft assembly do not perform the function of centering the two shafts or guiding them axially. The function of buckling-resistant axial guidance is carried out according to the invention by two bearings. One bearing is formed by a guide of the inner shaft, while the other bearing represents the outer surface of the inner shaft on which the hollow shaft chamber glides. The inventor has thus created in an advantageous manner a closed chamber in which the guide rods are house between the inner shaft and the outer hollow shaft assembly, that filled can be with a lubricant. The sealing between the hollow shaft and the outer surface of the inner shaft can be effected in a known manner.

Figure 1:
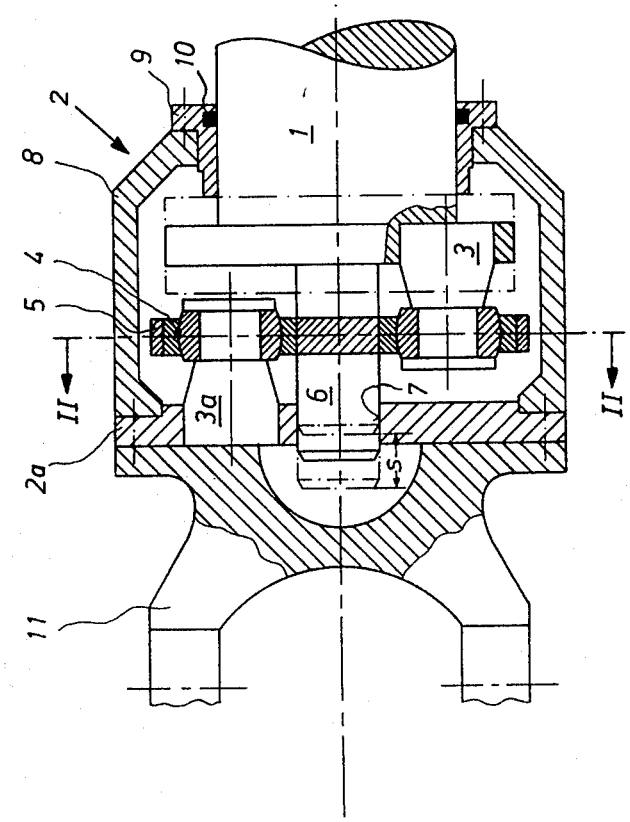
FIG. 1 shows a telescopic shaft in longitudinal section.

In FIG. 1, there is shown one end of an inner shaft 1, and one end of a hollow shaft 2. The hollow shaft assembly 2 comprises a fonte-type joint 11, a plate 2a and a casing 11. The other end of inner shaft 1 is not shown. Two bearing flanges 3 are evenly circumferentially distributed on inner shaft 1. In the same manner, plate 2a is provided with two bearing flanges 3a and with spherical bearings 4. One bearing flange 3 with bearing 4 of the inner shaft is connected with a bearing flange 3a with bearing 4 of the hollow shaft assembly by a guide rod 5. At least two guide rods are provided. The axial guidance of inner shaft 1 in hollow shaft 2 is achieved by a centrically arranged journal 6 which is a part of inner shaft 1, which rides in a corresponding guide hole 7 in plate 2a. Casing 8 which represents an extension of plate 2a, extends over inner shaft 1 between casing 8 and inner shaft 1. The sealing of the space thus formed is effected by a gasket 10 inside a sliding guide bushing 9 secured on casing 8.

The maximum displacement path "s" of the shafts relative to each other corresponds to the maximum angle of traverse of spherical bearings 4. The displacement stops of inner shaft 1 are provided, by sliding guide bushing 9 and by bearing flanges 3a of the hollow shaft. The represented fork-type joint 11 of the telescopic shaft can be secured in a simple manner on plate 2a.

Figure 2:
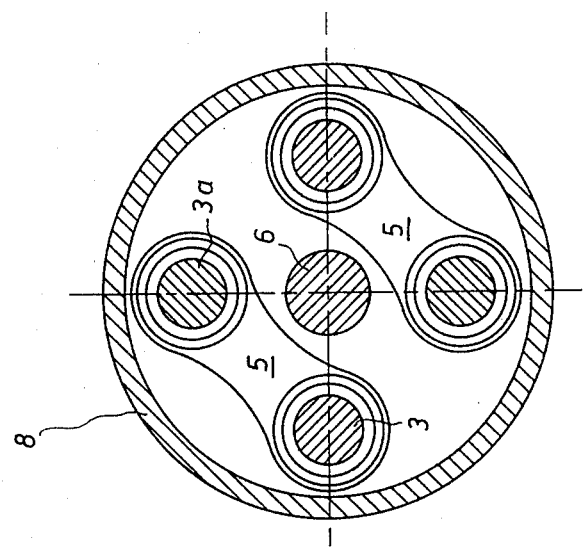
FIG. 2 shows a cross section through the guide rod arrangement at II—II.

FIG. 2 shows the arrangement of guide rods 5 in the axial direction. With two guide rods 5, bearing flanges 3 of inner shaft 1 and bearing flanges 3a of plate 2a are diametrically opposed to each other.

In another embodiment of the invention, the ends of guide rods 5 can be designed as spheres instead of the spherical bearings 4, and rest in correspondingly shaped depressions of bearing flanges 3 and 3a. This embodiment of the invention too has the advantages of low-friction longitudinal displaceability of a telescopic shaft.

In addition, it is possible to secure journal 6 on the hollow shaft and to provide guide 7 in inner shaft 1.

I claim:

1. A torque transmitting telescoping shaft assembly comprising: an inner shaft and a hollow shaft assembly arranged coaxially about the inner shaft to define a closed chamber therebetween, the inner shaft being telescopically received and displaceable in the axial direction relative to the hollow shaft assembly; at least two guide rods, for transmitting torque, arranged inside the chamber in a plane perpendicular to the axis of the shaft; said guide rods being movably mounted with one end connected to the inner shaft and the other end connected to the hollow shaft assembly so that the one end of a guide rod connected to the inner shaft alternates with one end of a guide rod connected to the hollow shaft assembly, seen in the direction of rotation; guide means axially telescopically guiding the inner shaft and the hollow shaft assembly relative to each other at least at two guide places; wherein the hollow shaft assembly includes a plate having an axial bore therethrough coaxially arranged about the longitudinal axis of the hollow shaft assembly; a journal coaxially arranged on the end of the inner shaft and extended through the plane of said guide rods and the bore comprising a first one of said guide places, and the inner shaft engaged to the hollow shaft assembly to define a second one of said guide places.

2. A torque transmitting telescoping shaft assembly comprising: an inner shaft and a hollow shaft assembly arranged coaxially about the inner shaft to define a closed chamber therebetween, the inner shaft being telescopically received and displaceable in the axial direction relative to the hollow shaft assembly; at least two guide rods, for transmitting torque, arranged inside the chamber in a plane perpendicular to the axis of the shaft; said guide rods being movably mounted with one end connected to the inner shaft and the other end connected to the hollow shaft assembly so that the one end of a guide rod connected to the inner shaft alternates with one end of a guide rod connected to the hollow shaft assembly, seen in the direction of rotation; guide means axially telescopically guiding the inner shaft and the hollow shaft assembly relative to each other at least at two guide places; wherein said guide rods are connected to said shafts through spherical bearings; and wherein the hollow shaft assembly includes a plate having an axial bore therethrough coaxially arranged about the longitudinal axis of the hollow shaft assembly; a journal coaxially arranged on the end of the inner shaft and extended through the plane of said guide rods and the bore comprising a first one of said guide places, and the inner shaft engaged to the hollow shaft assembly to define a second one of said guide places.

3. A telescoping shaft according to claim 1 or 2 wherein the inner shaft is axially displaceable within said chamber.

* * * * *